United States Patent
Ohno (10) Patent No.: US 11,852,587 B2
(45) Date of Patent: Dec. 26, 2023

(54) MICROFLUIDIC DEVICE OBSERVATION APPARATUS

(71) Applicant: Shimadzu Corporation, Kyoto (JP)

(72) Inventor: Yoshinori Ohno, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 507 days.

(21) Appl. No.: 17/261,113

(22) PCT Filed: Jul. 23, 2018

(86) PCT No.: PCT/JP2018/027553
§ 371 (c)(1),
(2) Date: Jan. 18, 2021

(87) PCT Pub. No.: WO2020/021603
PCT Pub. Date: Jan. 30, 2020

(65) Prior Publication Data
US 2021/0285880 A1    Sep. 16, 2021

(51) Int. Cl.
*G01N 21/64* (2006.01)
*G06T 7/12* (2017.01)
(Continued)

(52) U.S. Cl.
CPC ........... *G01N 21/6452* (2013.01); *G06T 7/12* (2017.01); *G06T 2207/30072* (2013.01)

(58) Field of Classification Search
None
See application file for complete search history.

(56) References Cited

U.S. PATENT DOCUMENTS 8,358,405 B2 * 1/2013 Kitamura ............... A61B 5/155
356/39
2014/0349333 A1 11/2014 Matsumoto et al.
(Continued)

FOREIGN PATENT DOCUMENTS

EP    4198914 A1 * 6/2023 ........ B01L 3/502715
JP    H11-097512 A    4/1999
(Continued)

OTHER PUBLICATIONS

Written Opinion by the International Search Authority for PCT application No. PCT/JP2018/027553, dated Oct. 23, 2018, submitted with a machine translation.

*Primary Examiner* — Mohammed Rachedine
(74) *Attorney, Agent, or Firm* — Muir Patent Law, PLLC (57) ABSTRACT

A microfluidic device observation apparatus 1 configured to observe a microfluidic device 100 where, in at least a partial region of the microfluidic device, a plurality of flow paths having same width are arranged in parallel, includes: an image acquiring unit 4 configured to acquire an image of the microfluidic device 100; an extracted pixel selection unit 21 configured to select an extracted pixel from a plurality of pixels forming the acquired image based on luminance values of the pixels, using a predetermined criterion; a feature pixel group detection unit 22 configured to detect a plurality of feature pixel groups among a plurality of extracted pixel groups each including a predetermined number of the extracted pixels that are continuously arranged in a line shape, where the plurality of feature pixel groups are parallel to each other with a predetermined degree or higher; a flow path boundary pixel group selection unit 23 configured to select flow path boundary pixel groups among the plurality of feature pixel groups, where a distance between the flow path boundary pixel groups corresponds to a width of the flow paths 103a to 103e; and a flow path image (Continued)

extraction unit 24 configured to identify a position of boundary of one or the plurality of flow paths 103*a* to 103*e* based on a position of the flow path boundary pixel group in the image and extract an image of each of the flow paths 103*a* to 103*e*.

6 Claims, 7 Drawing Sheets (51) Int. Cl.
    *G06T 7/181*         (2017.01)
    *G01N 21/41*        (2006.01)
    *G01N 35/08*        (2006.01)
    *G01N 37/00*        (2006.01)

(56) References Cited

U.S. PATENT DOCUMENTS

| | | | | |
|---|---|---|---|---|
| 2014/0376816 | A1* | 12/2014 | Lagae | G06F 18/24 |
| | | | | 382/134 |
| 2017/0234795 | A1* | 8/2017 | Issadore | G01N 21/6428 |
| | | | | 436/172 |
| 2021/0209752 | A1* | 7/2021 | Tenney | G06T 7/0012 |

FOREIGN PATENT DOCUMENTS

| | | | | |
|---|---|---|---|---|
| JP | 2013-003011 A | 1/2013 | | |
| JP | 2015-177806 A | 10/2015 | | |
| WO | WO-2011117952 A1 * | 9/2011 | ............ | A61B 5/1427 |
| WO | WO-2011117953 A1 * | 9/2011 | ......... | A61B 5/15003 |
| WO | 2013/038925 A1 | 3/2013 | | |
| WO | WO-2013057762 A1 * | 4/2013 | ............ | G01N 33/491 |
| WO | WO-2018173352 A1 * | 9/2018 | ............ | G06K 9/0014 |

* cited by examiner

MICROFLUIDIC DEVICE OBSERVATION APPARATUS

TECHNICAL FIELD

The present invention relates to a microfluidic device observation apparatus used for observing the inside of one or a plurality of flow paths provided in a microfluidic device.

BACKGROUND ART

A microfluidic device is a device having a substrate on which one or a plurality of flow paths are formed by a micromachining technique using Micro Electro Mechanical System (MEMS) or the like (see, for example, Patent Literature 1). For example, the microfluidic device is produced by joining an upper substrate and a lower substrate. The upper substrate has a recess portion to be the flow path formed on the lower surface side, and has a through hole, for introduction of a subject fluid and the like, formed at a position corresponding to an end portion of the flow path. The microfluidic devices are used to perform inspection on the susceptibility of bacteria and fungi (target bacteria) to antibacterial agents, for example, as described in Patent Literature 2.

CITATION LIST

Patent Literature

Patent Literature 1: JP 2013-3011 A
Patent Literature 2: JP 2015-177806 A
Patent Literature 3: JP H11-97512 A

SUMMARY OF INVENTION

Technical Problem

Figure 1:
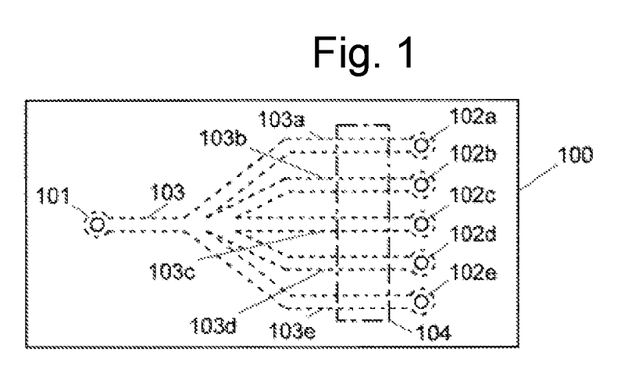
FIG. 1 illustrates an example of a configuration of a microfluidic device.

In order to describe the problem to be solved by the present invention in detail, an example of a microfluidic device used for the inspection will be described (see FIG. 1). This microfluidic device 100 has an upper surface provided with one introduction port 101 and five air ports 102a to 102e. The microfluidic device 100 has a bacterial solution introduction flow path 103 formed therein to have one end disposed immediately below the introduction port 101. The bacterial solution introduction flow path 103 is branched at an intermediate position into five branch flow paths 103a to 103e, and these branch flow paths each extend to a portion directly below a corresponding one of the air ports 102a to 102e. The five branch flow paths 103a to 103e are arranged in parallel with each other in the vicinity of the air ports 102a to 102e.

In the inspection for the target bacteria using the microfluidic device 100, first of all, antibacterial solutions a to d containing the same type of antibacterial agent at different concentrations are introduced into the branch flow paths 103a to 103d from the air ports 102a to 102d. The amount of the antibacterial solutions a to d thus introduced is set to make the solutions stay in the branch flow paths 103a to 103d (that is, without reaching the bacterial solution introduction flow path 103). No antibacterial solution is introduced into the branch flow path 103e. Then, the antibacterial solutions a to d introduced into the branch flow paths 103a to 103d are dried so that the antibacterial agent remains and is fixed on wall surfaces of the branch flow paths 103a to 103d. Then, a bacterial solution containing the target bacteria is introduced into the bacterial solution introduction flow path 103 from the introduction port 101. The air ports 102a to 102e for vent are formed at the end portions of the branch flow paths 103a to 103e so that the bacterial solution flows into each of the branch flow paths 103a to 103e with the air in each of the branch flow paths 103a to 103e discharged through the air ports in response to the bacterial solution flowing in. In the branch flow paths 103a to 103d, the inflowing bacterial solution comes into contact with the antibacterial agent fixed on the wall surfaces of the flow paths. After the bacterial solution has been introduced, the state of the target bacteria is checked at a predetermined time interval.

The state of the target bacteria is checked as follows. An inspector sets the microfluidic device 100 at a predetermined position of the microscope and acquires an image of a region (observation region) 104 captured in the field of view of the microscope. The inspector then identifies the portions in the image respectively corresponding to the branch flow paths 103a to 103e. Then, the number and state of bacteria existing inside each branch flow path 103a to 103e are checked.

As described above, no antibacterial solution is introduced into one of the branch flow paths (branch flow path 103e in the above example). Thus, the concentration of the antibacterial agent that needs to be included in the antibacterial solution to be used to exert the effect on the target bacteria can be recognized by comparing the number and the state of the bacteria confirmed in the image of the branch flow path 103e with the number and the state of the bacteria confirmed in the images of the other branch flow paths 103a to 103d.

In the above inspection, a microfluidic device having the number of branch flow paths corresponding to the number of antibacterial solutions (the number of concentrations of the antibacterial agent) is used. The above example involves the antibacterial agents with four different concentration and thus the number of branch flow paths is five. For example, if antibacterial agents with nine different concentrations are used, a microfluidic device having 10 branch flow paths needs to be used. Thus, the inspector has had to go through a cumbersome process of identifying the images of the branch flow paths the positions of which differ among microfluidic devices. Furthermore, in such an inspection, it is a common practice to repeatedly perform the procedure of making an antibacterial agent act on the target bacteria for a predetermined period of time and observing the state of the target bacteria. Furthermore, in many cases, the inspection involves a large number of microfluidic devices. Thus, the branch flow paths need to be identified in images repeatedly captured in each of a large number of microfluidic devices. Thus, a large load has been imposed on the inspector.

An object to be achieved by the present invention is to provide a microfluidic device observation apparatus capable of easily obtaining images of a plurality of flow paths arranged in a microfluidic device.

Solution to Problem

The present invention for solving the problems described above relates to a microfluidic device observation apparatus configured to observe a microfluidic device where, in at least a partial region of the microfluidic device, a plurality of flow paths having same width are arranged in parallel, the microfluidic device observation apparatus comprising:

an image acquiring unit configured to acquire an image of at least the partial region of the microfluidic device;

an extracted pixel selection unit configured to select an extracted pixel from a plurality of pixels forming the acquired image based on luminance values of the pixels, using a predetermined criterion;

a feature pixel group detection unit configured to detect a plurality of feature pixel groups among a plurality of extracted pixel groups each including a predetermined number of the extracted pixels that are continuously arranged in a line shape, where the plurality of feature pixel groups are parallel to each other with a predetermined degree or higher;

a flow path boundary pixel group selection unit configured to select flow path boundary pixel groups among the plurality of feature pixel groups, where a distance between the flow path boundary pixel groups corresponds to a width of the flow paths; and a flow path image extraction unit configured to identify positions of boundaries of the plurality of flow paths based on a position of the flow path boundary pixel groups in the image and extract an image of each of the flow paths.

The plurality of flow paths formed in the at least a partial region of the microfluidic device are typically linear flow paths (that is, flow paths with linear boundaries), but may also be arc shaped, elliptical shaped, or S shaped flow paths.

The type of the image acquiring unit is not limited as long as it can acquire an image in which brightness appears at the boundary of the flow path formed in the microfluidic device. For example, an optical microscope, an optical camera, a phase contrast microscope, and a differential interference microscope can be used as the image acquiring unit.

In the microfluidic device observation apparatus according to the present invention, first of all, the microfluidic device is set at a predetermined position of the image acquiring unit enabling the region (the partial region) in which the plurality of flow paths having same width are arranged in parallel to be captured within the field of view. Then, an image of the region is acquired. Next, the extracted pixels are selected from a plurality of pixels forming the image, based on luminance values of the plurality of pixels, using a predetermined criterion. This can be implemented by, for example, identifying pixels with a higher (lower) luminance than a threshold that is a luminance value (background luminance value) expected to indicate the luminance of a pixel at a position without any of the boundary of the flow path or a subject. Alternatively, a pixel with a higher (lower) luminance than a threshold that is an average value of the luminance of all the pixels, or a luminance value of a pixel at a position, such as four corners of the image, where any of the boundary of the flow path or a subject is expected to be absent. Furthermore, the luminance value may not be directly used. Instead, edge intensities (an amount of change in luminance) may be obtained from image data using a differential filter, and this value may be compared with a predetermined value to select the extracted pixel. With such a differential filter, selection of the extracted pixel corresponding to structures such as the boundary of the flow path is facilitated with the background excluded. Whether to select a pixel having high luminance or a pixel having low luminance may be determined according to the characteristics of the image acquiring unit to be used (whether the boundary of the flow path appears bright or dark).

In the image, brightness is generated by the boundary of the flow path, a structure such as a subject (for example, bacteria) inside the flow path, or noise. Therefore, the extracted pixels selected by the extracted pixel selection unit also include pixels corresponding to the positions with such brightness. Therefore, as the next step, feature pixel groups are selected among the extracted pixel groups each including a predetermined number of extracted pixels or more that are continuously arranged in a line shape, where the feature pixel groups are parallel to each other with a predetermined degree or higher. The term line shape as used herein is not limited to those with a width of a single pixel, and indicates those with a ratio between the width and the length being a predetermined value or more. Furthermore, this line shape may be any shape conforming to the shape of the flow path, and is not necessarily limited to a straight line shape, and may be an arc shape, an S shape, or the like. The processing can be implemented by, for example, obtaining a shape formed by a plurality of extracted pixels adjacently positioned, identifying the extending direction of the line from the shape, and selecting the one with a predetermined number of extracted pixels or more arranged along this direction. The predetermined number may be a number sufficient for enabling estimation of a structure at the positions of the pixels arranged in a length corresponding to the predetermined number. In general, it is rare for noise data to continuously exist over a larger number of pixels. Thus, extracted pixels corresponding to noise can be excluded with this processing. Furthermore, the degree of parallel (parallelism) between a plurality of extracted pixel groups can be determined, for example, by obtaining an approximate straight line from the position of each extracted pixel group and comparing the slopes of the straight lines with each other.

Next, from the plurality of feature pixel groups, the flow path boundary pixel groups are selected among the feature pixel groups, where the distance between the flow path boundary pixel groups corresponds to the width of the flow paths. Thus, the positions of the boundaries of the flow path in the image are identified. Finally, the positions of the boundaries of a plurality of flow paths are identified based on the positions of the flow path boundary pixel groups, and an image of each flow path is extracted.

As described above, in the microfluidic device observation apparatus according to the present invention, the image acquired by the image acquiring unit is processed by the extracted pixel selection unit, the feature pixel group detection unit, the flow path boundary pixel group selection unit, and the flow path image extraction unit in this order. As a result, the image of each flow path is obtained. Thus, the inspector him or herself needs not to manually extract the image of each flow path from the image of the observation region. Thus, the image of each flow path can easily be obtained.

In many cases, the plurality of flow paths are also formed at a constant interval in at least a partial region of the microfluidic device. In view of this the microfluidic device observation apparatus according to the present invention may further be configured in such a manner that the flow path boundary pixel group selection unit selects, as the flow path boundary pixel groups, ones with same distance between two adjacent ones of the feature pixel groups. With this configuration, the pixels corresponding to the boundary portions of the flow path can be extracted more accurately.

Advantageous Effects of Invention

With a microfluidic device observation apparatus according to the present invention, images of a plurality of flow paths arranged in a microfluidic device can be easily obtained.

DESCRIPTION OF EMBODIMENTS

An embodiment of a microfluidic device observation apparatus according to the present invention will be described below with reference to the drawings. In the present embodiment, a case is described where the susceptibility of the target bacteria to the antibacterial solutions a to d containing the same antibacterial agent at four different concentrations is inspected using the microfluidic device 100 described with reference to FIG. 1.

Figure 2:
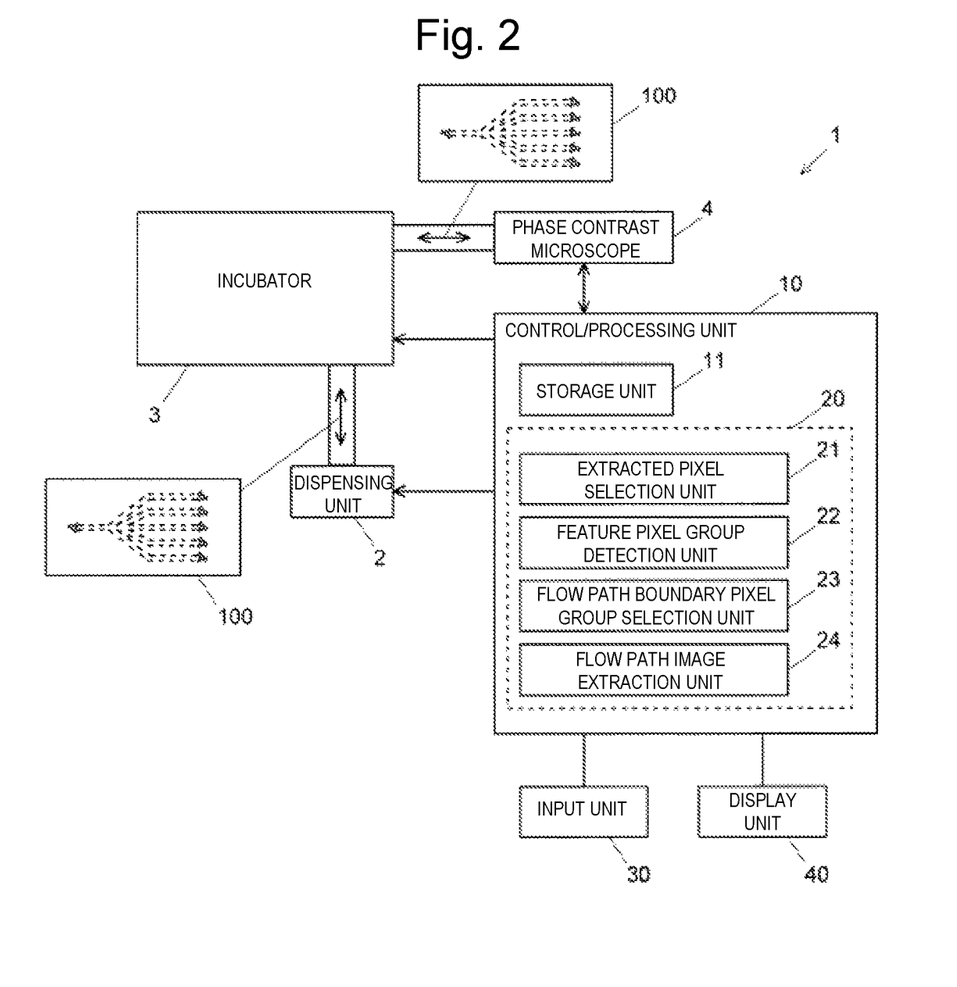
FIG. 2 is a diagram illustrating a configuration of a main part of a microfluidic device observation apparatus according to one embodiment of the present invention.

FIG. 2 is a diagram illustrating a configuration of a main part of a microfluidic device observation apparatus 1 according to the present embodiment. The microfluidic device observation apparatus 1 according to the present embodiment includes a dispensing unit 2, an incubator 3, a phase contrast microscope 4 (image acquiring unit), and a control/processing unit 10. A device conveyance path and a conveyance mechanism (not illustrated) are provided between the dispensing unit 2 and the incubator 3 and between the incubator and the phase contrast microscope 4, to convey the microfluidic device 100 between these components in response to an instruction from the control/processing unit 10.

The control/processing unit 10 has a function of controlling the operation of the dispensing unit 2, the incubator 3, and the phase contrast microscope 4, and a function of processing an image obtained by the phase contrast microscope 4. The control/processing unit 10 includes a storage unit 11, and further includes functional blocks including an extracted pixel selection unit 21, a feature pixel group detection unit 22, a flow path boundary pixel group selection unit 23, and a flow path image extraction unit 24. The control/processing unit 10 is actually a general computer, and these functional blocks are implemented when a processor of the computer executes a microfluidic device observation program 20. The control/processing unit 10 is connected to an input unit 30 for an inspector to input information as appropriate and a display unit 40 for displaying an image of the flow path of the microfluidic device 100 and the like.

This microfluidic device 100 has an upper surface provided with one introduction port 101 and five air ports 102a to 102e. The microfluidic device 100 has a bacterial solution introduction flow path 103 formed therein and the bacterial solution introduction flow path 103 has one end disposed immediately below the introduction port 101. The bacterial solution introduction flow path 103 is branched at an intermediate position into five branch flow paths 103a to 103e, and these branch flow paths each linearly extends to a portion directly below a corresponding one of the air ports 102a to 102e. The five branch flow paths 103a to 103e are arranged in parallel with each other in the vicinity of the air ports 102a to 102e. Note that FIG. 1 is simplified view of the branch flow paths 103a to 103e. In an actual microfluidic device, the flow path width of the branch flow paths 103a to 103e are greater than the flow path interval.

Next, a flow of the inspection on the susceptibility of target bacteria to an antibacterial agent performed using the microfluidic device observation apparatus 1 according to the present embodiment will be described.

The inspector prepares a bacterial solution containing a predetermined ratio of the target bacteria (for example, determined by the number of the target bacteria and the amount of the culture solution therefor) and antibacterial solutions a to d containing the antibacterial agents at different concentrations to be used for the inspection, and sets these to the dispensing unit 2.

When the inspector instructs to start the inspection through the input unit 30, the control/processing unit 10 transmits a control signal instructing the start of a dispensing operation to the dispensing unit 2.

The dispensing unit 2 introduces the antibacterial solutions a to d respectively to the branch flow paths 103a to 103d of the microfluidic device 100, and then introduces the bacterial solution containing the target bacteria into the bacterial solution introduction flow path 103 from the introduction port 101. The amount of the bacterial solution introduced is set in advance to make the bacterial solution reach the positions where the antibacterial agent remains and is fixed in the branch flow paths 103a to 103d. The air ports 102a to 102e for vent are formed at the end portions of the branch flow paths 103a to 103e so that the bacterial solution flows into each of the branch flow paths 103a to 103e with the air in each of the branch flow paths 103a to 103e discharged through the air ports in response to the bacterial solution flowing in. In the branch flow paths 103a to 103d, the inflowing bacterial solution comes into contact with the antibacterial agent fixed on the wall surfaces of the flow paths.

After the antibacterial solutions a to d and the bacterial solution have been introduced, the microfluidic device 100 is conveyed to the incubator 3 and is heated to a predetermined temperature for a predetermined period of time to culture the target bacteria. When the culturing for the predetermined period of time is completed, the microfluidic device 100 is conveyed from the incubator 3 to the phase contrast microscope 4. Hereinafter, a procedure for extracting an image of the flow path of the microfluidic device in the microfluidic device observation apparatus 1 according to the present embodiment will be described with reference to a flowchart in FIG. 3.

Figure 3:
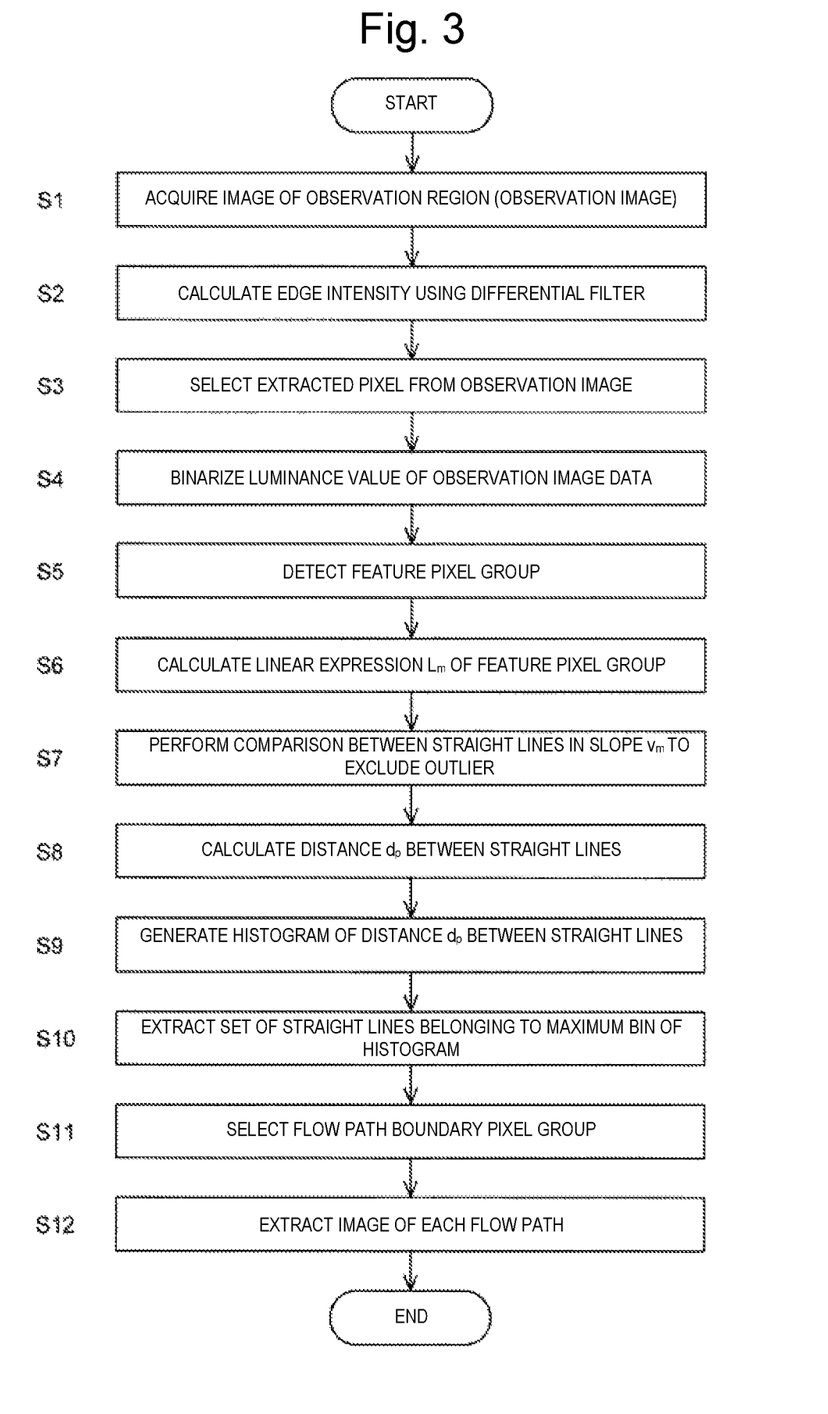
FIG. 3 is a flowchart illustrating a procedure for extracting an image of a flow path in the microfluidic device according to the present embodiment.

The microfluidic device 100 conveyed to the phase contrast microscope 4 is held in a predetermined orientation at a predetermined image acquisition position. The phase contrast microscope 4 captures an image of a region of the microfluidic device 100 within its field of view. Of the entire microfluidic device 100, the region within the field of view of the phase contrast microscope 4 (corresponding to at least a partial region in the present invention) serves as an observation region 104. The phase contrast microscope 4 acquires an image (hereinafter, referred to as an "observation image") of the observation region 104 (step S1). The phase contrast microscope 4 transmits image data on the observation region 104 thus acquired to the control/processing unit 10. The control/processing unit 10 stores the received captured image data in the storage unit 11.

When the image data is stored in the storage unit 11, an extracted pixel selection unit 21 calculates edge intensities (an amount of change in luminance) in the image using a differential filter (step S2). Processing described later may be directly executed on the image acquired by the phase contrast microscope 4, but can proceed with a higher accuracy using edge intensities in the image if preprocessing is executed using a differential filter. As the differential filter, a first-order differential filter such as a sobel filter, a prewitt filter, or a canny filter, or a second-order differential filter such as a laplacian filter can be used. Furthermore, instead of using the differential filter, various methods for detecting the change in luminance in the image data, such as a morphology operation, can be used.

Figure 4:
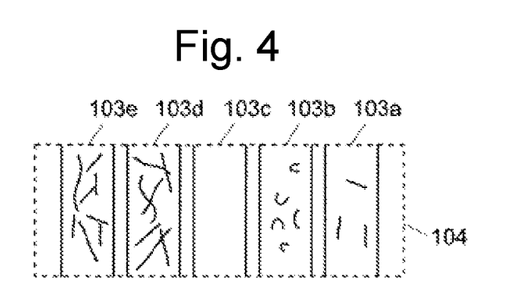
FIG. 4 is an example of an image in which luminance values of an observation image data are binarized according to the present embodiment.

The extracted pixel selection unit 21 selects, in image data from which the edge intensities have been extracted using a differential filter, pixels with the edge intensity of a predetermined value or greater as extracted pixels (step S3). Then, the extracted image selection unit 21 gives 1 to pixels thus selected, and gives 0 to pixels not selected, to binarize the image data (step S4. See FIG. 4). The binarization is implemented with the values 0 and 1 herein, but may also be implemented using other values or signs. Furthermore, here, the extracted pixel is selected based on the same value regardless of the position in the pixel. Alternatively, a predetermined value corresponding to the luminance value of each pixel may be used (for example, the extracted pixel may be a pixel with an edge intensity value that is not less than a predetermined percentage of the luminance value of the pixel of interest). With such a configuration, the extracted pixels can be appropriately selected even when the image includes a bright (large luminance value) portion and a dark (small luminance value) portion, depending on the environment in which the image is acquired. Furthermore, different values may be used in accordance with variation of luminance values within a predetermined range centered on the pixel of interest (a range of nine pixels×nine pixels for example) in the entire image. The size of the bacteria is extremely small compared with the width and length of the flow path. However, in FIG. 4, the target bacteria are illustrated to be larger than the actual size for the sake of visibility.

The extracted pixels selected by the above processing include pixels located at the boundary of the flow path, pixels at the position where the target bacteria exist, pixels at the position where noise is generated, and the like. Thus, as the next step, the feature pixel group detection unit 22 detects, as a feature pixel group, a predetermined number or more of extracted pixels that are continuously arranged in a line shape, from the binarized image data (step S5). Here, the predetermined number is set to be sufficient to enable the shape of the feature pixel group to be estimated from the positions of this number of pixels. About how many the predetermined number should be depends on the shape of the flow path. In the present embodiment, a linear expression representing the feature pixel group is obtained based on the positions (coordinates) of the pixels forming the feature pixel group. Thus, it suffices if at least two extracted pixels are included. However, the accuracy of the linear expression is low if the predetermined number is too small. On the other hand, while a larger predetermined number enables the linear expression representing the feature pixel group to be obtained with a higher accuracy, if the predetermined number is too large, an extracted pixel positioned at the boundary of the flow path would not be detected as a part of the feature pixel group when a part of pixels positioned at the boundary of the flow path fails to be selected due to lack of brightness (when the number of continuous extracted pixels is insufficient). Considering these, the predetermined number is preferably set to be approximately the number of pixels corresponding to a length that is 10% of the image size (minor diameter in a case of a rectangular image, diameter in a case of a circular image).

Next, the flow path boundary pixel group selection unit 23 assigns a number m (m is an integer that is equal to or larger than 1 and equal to or smaller than n) to n feature pixel groups detected by the feature pixel group detection unit 22, and obtains a linear expression $L_m$ representing each feature pixel group (step S6). The linear expression $L_m$ representing a feature pixel group means an approximate straight line based on the coordinates of a plurality of extracted pixels in the feature pixel group. In the present embodiment, the Hough transform is used to obtain the linear expression $L_m$ representing each feature pixel group.

The Hough transform is one of the methods used for extracting image features in the field of image processing. With the Hough transform, the linear expression is expressed using a distance r of the normal from the origin to the straight line and an angle θ between the normal and the x-axis on a two-dimensional plane (x-y plane). The Hough transform uses the linear expression expressed as in the following Formula (1).

$$r = x \cos\theta + y \sin\theta \quad (1)$$

First of all, a linear expression using Formula (1) is obtained for one of the extracted pixels forming the feature pixel group. At this point, only a single coordinate value is designated. Thus, the linear expression is not uniquely determined, and is a function of r and θ. For each of the extracted pixels forming the feature pixel group, the function of r and θ is obtained using the coordinates of the extracted pixel. Then, the functions of r and θ obtained, the number of which is the same as the number of extracted pixels, are projected onto a Hough space with two axes representing r and θ, and the values of r and θ with a large number of projections (highest degree of coincidence) are obtained. Thus, a linear expression representing the feature pixel group is determined. When the extracted pixels forming the feature pixel group are positioned on one straight line, the functions of r and θ obtained for these respective extracted pixels intersect at one point, and the straight line can be precisely determined by the values of r and θ that correspond to the intersection. However, in an actual image, the feature pixel group includes a plurality of pixels in the width direction or a part of the feature pixel group forms a stepped form. Thus, it is extremely rare for the extracted pixels to be completely positioned on one straight line. In view of this, the linear expression corresponding to the feature pixel group is determined from the values of r and θ with a large number of projections in the Hough space. In this manner, as the linear expression $L_m$ for the m-th feature pixel group, the following Formula (2) is obtained.

$$a_m x + b_m y = 1 \ (a_m \text{ and } b_m \text{ are coefficients}) \quad (2)$$

In the present embodiment, the linear expression $L_m$ corresponding to each feature pixel group is obtained using the Hough transform, but the linear expression $L_m$ can also be obtained by other methods. For example, the least squares method can be used to obtain an approximate straight line for the coordinates of the respective extracted pixels forming the feature pixel group.

Next, the flow path boundary pixel group selection unit 23 determines a slope of the linear expression $L_m$ obtained for each of the feature pixel groups. A unit vector $v_m$ representing the slope of the linear expression $L_m$ expressed by the above equation (2) is expressed as in the following Formula (3).

$$v_m = (-b_m/l_m, a_m/l_m) \text{ (where } l_m = (a_m^2 + b_m^2)^{1/2}) \quad (3)$$

After the slopes $v_m$ have been obtained for all the linear expressions $L_m$, a median $v_{ctr}$ of the slopes is calculated. Then, the feature pixel group (outlier) corresponding to a straight line having a slope not satisfying the following Formula (4) is excluded from the processing target (step S7).

$$|<v_m \cdot v_{ctr}>| \geq \alpha (\alpha \text{ is a value equal to or greater than 0} \text{ and equal to or less than 1}) \quad (4)$$

Formula (4) represents the inner product of the slope $v_m$ of the linear expression $L_m$ corresponding to the each feature pixel group and the median $v_{ctr}$ of all of the slopes. Furthermore, α is a real number that is equal to or greater than 0 and is less than 1. More specifically, Formula (4) indicates that the parallelism with respect to the straight line having the slope of the mean value $v_{ctr}$ is at a certain level or higher (the slope $v_m$ of the linear expression $L_m$ is close to the slope of another linear expression). In the microfluidic device 100 of the present embodiment, the plurality of branch flow paths 103a to 103e are formed in parallel in the observation region 104. Thus, the straight lines corresponding to the feature pixel groups located at the boundaries of the flow paths should be parallel to each other. Thus, with a feature pixel group corresponding to a straight line having a slope not satisfying the above Formula (4) excluded from the processing target, the feature pixel group (such as a feature pixel group corresponding to the position of the target bacteria) that is anticipated not to be the boundary of the flow path can be excluded.

Here, the median $v_{ctr}$ of the linear expressions $L_m$ corresponding to the respective feature pixel groups is used, but this does not mean that the median has to be used. Any appropriate value can be used including: an average of the slopes $v_m$ of the linear expressions $L_m$ corresponding to the respective feature pixel groups; and an average of a distribution of the slopes $v_m$ of the linear expressions $L_m$ corresponding to the respective feature pixel groups, obtained with a predetermined number of slopes corresponding to the end portion of the distribution excluded. Furthermore, if the slope of the straight line corresponding to the boundary of the flow path (the slope of the flow path in the observation image) can be roughly estimated, the estimated value of the slope can also be used.

A distance is obtained between each of k (k≤n) linear expressions $L_p$ (p is an integer that is equal to or greater than 1 and equal to or less than k) remaining after the processing described above, and another straight line that is adjacent to the straight line and is on a certain side of straight line (a positive side on the x axis for example) (step S8). These linear expressions $L_p$ are not precisely parallel to each other, and thus a distance $d_p$ between the straight lines is defined as follows.

Figure 5A:
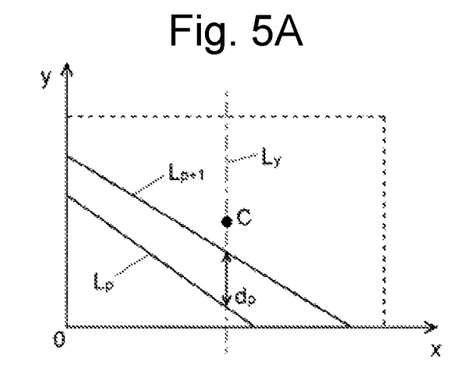
FIGS. 5A-5C are diagrams illustrating a method of obtaining a distance between straight lines according to the present embodiment.
Figure 5B:
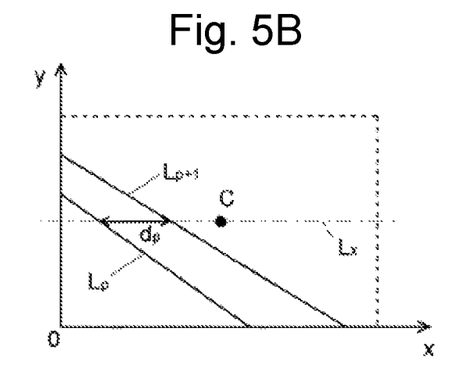
Figure 5C:
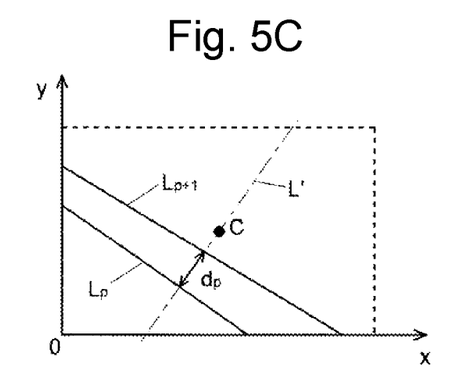

In the present embodiment, as illustrated in FIG. 5A, an intersection between a straight line (linear expression $L_y$) that is parallel with the y axis and passes through the center C of the observation image and each of the linear expression $L_p$ of interest and an adjacent straight line represented a linear expression $L_{p+1}$ is obtained. The distance $d_p$ between both straight lines is the distance between these intersections. As illustrated in FIG. 5B, an intersection between a straight line (linear expression $L_x$) that is parallel with the x axis and passes through the center C of the observation image and each of the linear expression $L_p$ of interest and an adjacent straight line represented a linear expression $L_{p+1}$ may be obtained, and the distance $d_p$ between both straight lines may be the distance between the intersections. Furthermore, as illustrated in FIG. 5C, an intersection between a straight line (a normal L' of the linear expression $L_p$) that passes through the center C of the observation image and each of the straight line $L_p$ of interest and an adjacent straight line represented a straight line $L_{p+1}$ may be obtained, and the distance $d_p$ between both straight lines may be the distance between the intersections.

Next, a histogram is generated with a predetermined bin width for the distance $d_p$ between straight lines obtained for each of k−1 straight lines (step S9). The flow path width and the flow path interval of the branch flow paths 103a to 103e formed in the microfluidic device 100 of the present embodiment are both constant. Therefore, in the histogram generated, the number of the distances $d_p$ corresponding to the flow path width should be the largest, followed by the number of the distances $d_p$ corresponding to the flow path interval. Therefore, for each of the k−1 straight lines, it is determined whether the distance $d_p$ related to the straight line is included in the maximum bin.

Figure 6A:
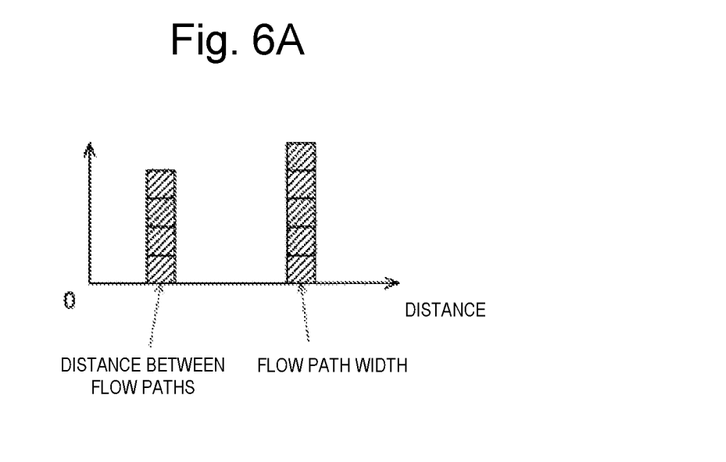
FIGS. 6A-6C are examples of a histogram generated according to the present embodiment.

In the microfluidic device 100 of the present embodiment, the five branch flow paths 103a to 103e are formed in parallel with each other. Therefore, ideally, as illustrated in FIG. 6A, there are four pieces of data at the positions corresponding to the distance between the flow paths and five pieces of data at the positions corresponding to the flow path width, with no data in any other positions. If such a histogram is obtained, it is determined that the distances $d_p$ obtained for the five straight lines are included in the maximum bin. For the one determined to be included in the maximum bin, the pixel group (flow path boundary pixel group) forming the boundary of the flow path can be selected by extracting a corresponding set of the straight line $L_p$ and the straight line $L_{p+1}$ adjacent to the straight line.

Figure 6B:
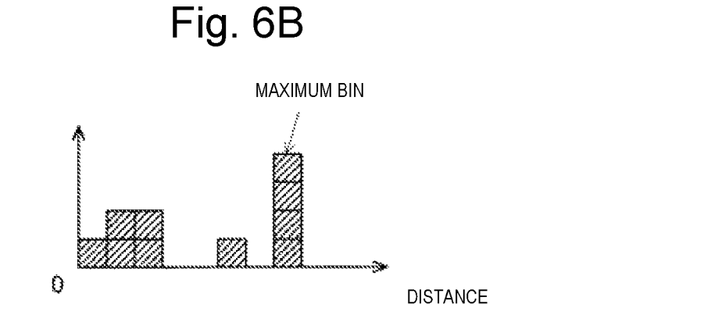
Figure 6C:
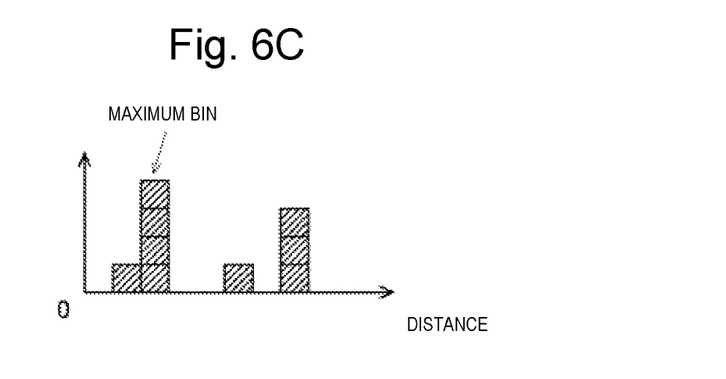

However, in reality, even after the above-mentioned processes, a straight line (a straight line derived from the target bacteria or a straight line derived from noise) other than the straight line forming the boundary of the flow path may be included. FIG. 6B and FIG. 6C illustrate examples of histograms obtained in such a case. Still in such a case, the straight lines forming the boundary of the flow path are located at regular intervals according to the flow path width and the distance between the flow paths, whereas the other straight lines are randomly located. Therefore, when the maximum bin in the histogram is selected, the flow path width (FIG. 6B) or the distance between flow paths (FIG. 6C) will be selected. Thus, the pixel group (flow path boundary pixel group) forming the boundary of the flow path can be selected (step S11) by extracting a corresponding set of the straight line $L_p$ and the straight line $L_{p+1}$ adjacent to the straight line (step S10).

Figure 7A:
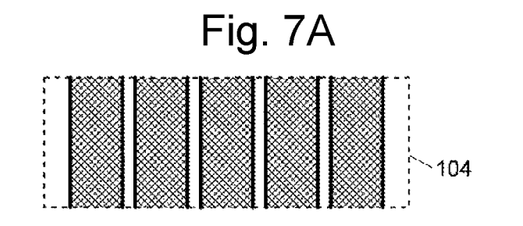
FIGS. 7A-7C are diagrams illustrating a method of extracting a flow path from an observation image according to the present embodiment.
Figure 7B:
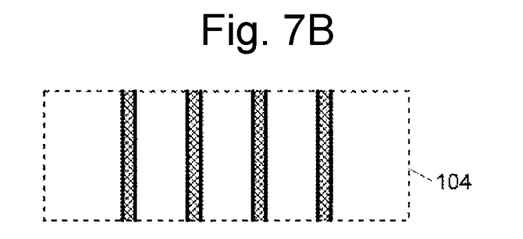

With the flow path boundary pixel group selected through the above processing, the position of the boundary of the flow path in the observation image can be recognized as illustrated in FIG. 7A or FIG. 7B. In the state illustrated in FIG. 7A (the state obtained from the histogram in FIG. 6A or FIG. 6B), each two lines may be selected as one set from the end portion of the image, and a region (hatched) sandwiched therebetween may be regarded as the flow path. On the other hand, in the state illustrated in FIG. 7B (the state obtained from the histogram in FIG. 6C), each two lines may be selected as one set from the end portion of the image, but a region (hatched) sandwiched therebetween is not a flow path.

Figure 7C:
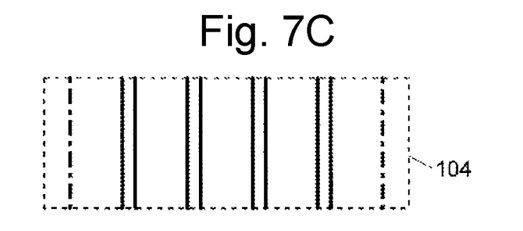

Thus, the flow path width of the flow path as a region sandwiched between a set of two straight lines selected from the end portion of a flow path the position of which is determined in the observation image, is compared with the flow path width of the flow path as a region sandwiched between a set of two straight lines sequentially selected from the second straight line from the end portion, to determine which is wider. As described above, in FIG. 1, the flow path width is illustrated to be narrow, but this is for the sake of visibility of the flow paths, and in the microfluidic device actually used, the flow path width is wider than the flow path interval. Therefore, the one determined to be wider as a result of the comparison described above is regarded as the flow path. If it is determined that the flow path width of the latter (when a set of two lines are sequentially selected from the second straight line from the end portion) is wider, one flow path boundary pixel group arranged in a form of a straight line remains at each of both ends of the image. Then, it is determined whether a flow path with the same width as the other flow path can be added on the outer side of each of the straight lines remaining at both ends (whether there are spaces corresponding to the flow path width on the outer sides of the straight lines). When the flow path can be added, a straight line (illustrated in one dot chain line in FIG. 7C) corresponding to the boundary of the flow path is added. Thus, a flow path is added.

When the position of the flow path in the observation image is confirmed by the above processing, the flow path image extraction unit 24 extracts the image of each of the flow paths 103a to 103e confirmed in the observation image (step S12). Then, image data on these images are stored in the storage unit 11, and these images are displayed on the display unit 40. In this process, the image with the position of the flow path confirmed may be directly extracted, but the brightness of the boundary of the flow path may affect the image of the flow path. In view of this, to prevent the brightness from being erroneously recognized as the target bacteria, a region shifted by predetermined pixels from the position of the flow path confirmed may be extracted as the image of the flow path. Alternatively, instead of extracting the images of each flow path individually, an image processes to have a black or white mask applied to a portion other than the flow path of the observation image may be generated, or an image in which the flow path portion of the observation image is highlighted may be generated.

The above embodiment is an example, and can be appropriately modified in accordance with the spirit of the present invention.

In the above embodiment, the case is described where the susceptibility of the target bacteria to the antibacterial agent is inspected, but a microfluidic device observation apparatus similar to the one described above may be used for inspection for other purposes and the like.

In the above embodiment, an example is described where the five linear branch flow paths 103a to 103e are formed in the microfluidic device 100. However, the number of flow paths may be changed as appropriate depending on the number of antibacterial solutions (different concentrations) used for the inspection. Furthermore, the shape of the flow path is not limited to a linear shape, and may be a curved shape. The curved shape can be, for example, an arc shape (including an elliptical arc) or an S shape (meandering shape). The Hough transform can also be applied to a case where the flow path shape is a curved shape. Specifically, when the flow path shape is an arc or an elliptical arc shape, the shape of the feature pixel group may be obtained by a formula expressing a circle or an ellipse instead of the Hough transform of the above embodiment, and parallelism between curved lines may be used instead of the parallelism between the straight lines as in the above embodiment. For example, a concept of a parallel curve defined as a curve that is at a certain distance in a normal direction from points on a certain curve may be used.

In the above embodiment, a phase contrast microscope is used as the image acquiring unit, but the type of the image acquiring unit is not limited as long as it can acquire an image in which brightness appears at the boundary of the flow path formed in the microfluidic device. For example, an optical microscope, an optical camera, and a differential interference microscope can be used.

In the above embodiment, after the position of the flow path has been determined in the observation image, a flow path width in a case where a region sandwiched between a set of two straight lines selected from an end portion of the image is determined as a flow path is compared with a flow path width in a case where a region sandwiched between a set of two straight lines sequentially selected from the second straight line from the end portion is determined as a flow path, to determine the flow path. Alternatively, an image in which the position of the flow path in the observation image is confirmed may be displayed on the display unit 40, and the inspector may select which one is the flow path through an operation on the input unit 30. Further alternatively, an image as a result of determining a flow path without performing the comparison described above and extracting an image of a flow path by the flow path image extraction unit 24 may be displayed on the display unit 40. Then, the inspector who has checked the image and determined that the flow path is actually not a flow path may issue an instruction to perform an inverting operation (an operation to determine a region sandwiched between two straight lines that are different from the set of straight lines that was previously used as boundaries forming the flow path, and making the flow path image extraction unit 24 extract the resultant image).

REFERENCE SIGNS LIST

1 . . . Microfluidic Device Observation Apparatus
2 . . . Dispensing Unit
3 . . . Incubator
4 . . . Phase Contrast Microscope
10 . . . Control/Processing Unit
11 . . . Storage Unit
20 . . . Microfluidic Device Observation Program
21 . . . Extracted Pixel Selection Unit
22 . . . Feature Pixel Group Detection Unit
23 . . . Flow Path Boundary Pixel Group Selection Unit
24 . . . Flow Path Image Extraction Unit
30 . . . Input Unit
40 . . . Display Unit
100 . . . Microfluidic Device
101 . . . Introduction Port
102a-102e . . . Air Port
103 . . . Bacterial Solution Introduction Flow Path
103a-103e . . . Branch Flow Path
104 . . . Observation Region

The invention claimed is:

1. A microfluidic device observation apparatus configured to observe a microfluidic device where, in at least a partial region of the microfluidic device, a plurality of flow paths having same width are arranged in parallel, the microfluidic device observation apparatus comprising:

an image acquiring unit configured to acquire an image of at least the partial region of the microfluidic device; and a processor configured to:
- select an extracted pixel from a plurality of pixels forming the acquired image based on luminance values of the pixels, using a predetermined criterion,
- detect a plurality of feature pixel groups among a plurality of extracted pixel groups each including a predetermined number of the extracted pixels that are continuously arranged in a line shape, where the plurality of feature pixel groups are parallel to each other with a predetermined degree or higher,
- select flow path boundary pixel groups among the plurality of feature pixel groups, where a distance between the flow path boundary pixel groups corresponds to a width of the flow paths, and
- identify positions of boundaries of the plurality of flow paths based on a position of the flow path boundary pixel groups in the image and extract an image of each of the flow paths.

2. The microfluidic device observation apparatus according to claim 1, wherein the processor is configured to obtain edge intensities in the image using a differential filter.

3. The microfluidic device observation apparatus according to claim 1, wherein the flow paths are linearly formed, and the processor is configured to obtain, for each of the extracted pixel groups, an approximate straight line corresponding to a position of a pixel forming the extracted pixel group, and to detect, as the feature pixel group, one with a difference between a slope of the approximate straight line and another approximate straight line being equal to or smaller than a predetermined difference.

4. The microfluidic device observation apparatus according to claim 3, wherein the processor is configured to obtain the approximate straight line by Hough transform.

5. The microfluidic device observation apparatus according to claim 1, wherein the processor is configured to select, as the flow path boundary pixel groups, ones with same distance between two adjacent ones of the feature pixel groups.

6. The microfluidic device observation apparatus according to claim 5, wherein the processor is configured to generate a histogram of the distance, and to select, as the flow path boundary pixel groups, one belonging to a maximum bin of the histogram.

\* \* \* \* \*